Dec. 16, 1958 C. D. KISSINGER 2,864,567
AIRCRAFT
Filed April 28, 1954

INVENTOR
CURTIS D. KISSINGER
BY Allen M. Sutton
HIS ATTORNEY

United States Patent Office 2,864,567
Patented Dec. 16, 1958

2,864,567

AIRCRAFT

Curtis D. Kissinger, Gloversville, N. Y.

Application April 28, 1954, Serial No. 426,195

3 Claims. (Cl. 244—13)

This invention relates to aircraft of the heavier-than-air type, and more particularly to an improved aircraft of "flying saucer" type, which is characterized by a circular outline when viewed from above or below.

A primary object of the invention is to provide an improved aircraft that is inherently more stable in flight than conventional types in use today, and which has great structural ruggedness.

Another object is to provide an improved aircraft, which is capable of slower take-off and landing speeds than aircraft heretofore known, and which is so constructed that the main airfoil is at the most advantageous angle possible during the landing and take-off of the aircraft.

A further object of the invention is to provide an improved aircraft that embodies maximum lifting surface without increase in the overall dimensions, as compared to conventional aircraft, and which is capable of increased economy of operation.

An aircraft constructed in accordance with the invention may comprise a main airfoil or wing of substantially discoid shape having a cut-out segment at its trailing edge, and a complementary trailing horizontal stabilizer that completes the circular shape of the aircraft when viewed from above or below. The horizontal stabilizer is supported between two vertical stabilizers in a plane roughly parallel to and above the plane of the main airfoil. A passenger compartment may be partially or entirely enclosed within the main airfoil, depending upon the size and thickness of the main airfoil, and an engine of conventional reciprocating or jet type may also be enclosed within the main airfoil.

It is pointed out that aircraft constructed in accordance with the invention may range in size from large transports capable of carrying many passengers and maximum loads down to a model driven by a miniature gasoline engine, or even down to a small model glider. The objects and advantages of the invention may be attained regardless of the size of the aircraft.

For a better understanding of the invention, reference is made to the following description of one embodiment thereof, taken in conjunction with the accompanying drawing, in which like numerals refer to like parts throughout, and in which—

Figure 1:
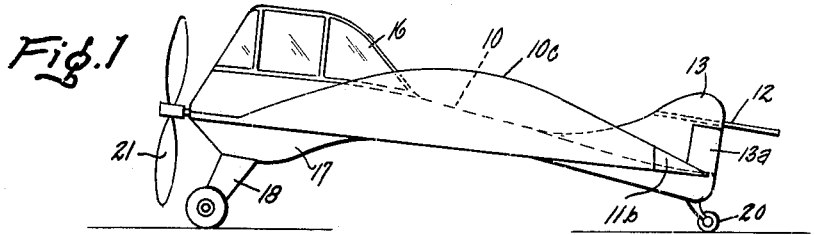
Fig. 1 is a side view of a small passenger-carrying aircraft constructed in accordance with my invention.
Figure 2:
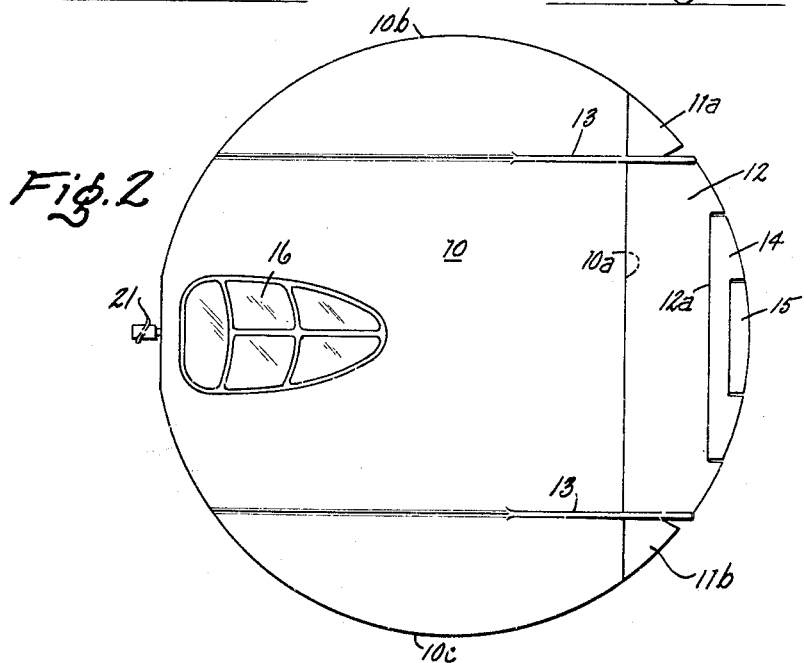
Fig. 2 is a plan view of the aircraft shown in Fig. 1.
Figure 3:
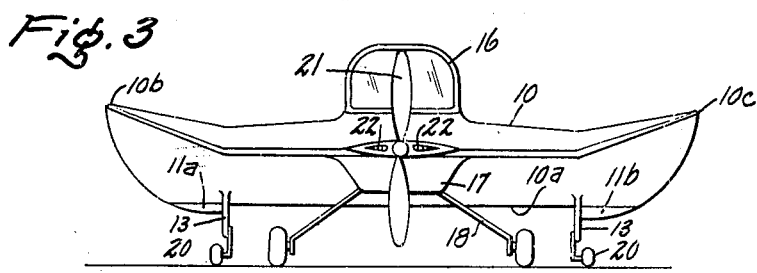
Figs. 3 and 4 are front and side views, respectively, of the aircraft shown in Fig. 1.
Figure 4:
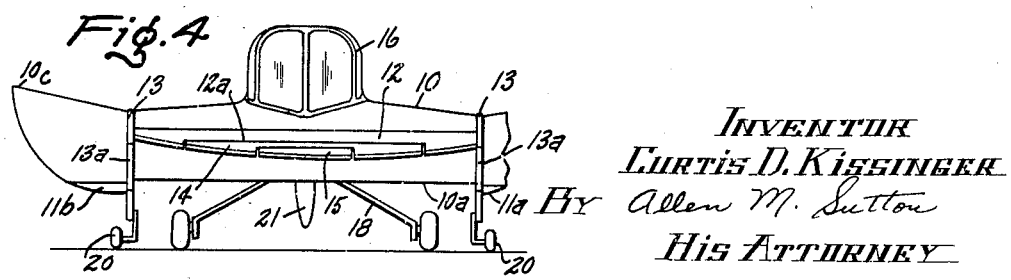

Referring now to the drawing, it is seen that the aircraft comprises a main airfoil 10 or wing of substantially discoid shape, but having a cut-out segmental portion 10a at the trailing edge thereof. The main airfoil 10 is provided with dihedral to define tip portions 10b and 10c, and is of standard airfoil shape (as best seen in Fig. 1) having a suitable peripheral taper, in accordance with the usual practice of good aircraft design. Outboard at the opposite ends of the cut-out segmental portion 10a of the main airfoil are a pair of approximately triangle-shaped ailerons 11a and 11b hinged to the main airfoil and controlled from the passenger compartment in the usual manner. A horizontal stabilizer 12 of segmental shape complementary to the main airfoil 10, is supported above the main airfoil between two vertical stabilizers 13 in substantial alignment with the cut-out portion 10a of the main airfoil and with a negative angle of attack of approximately 5° relative to the main airfoil. The vertical stabilizers 13 rise above the main airfoil on opposite sides of the cut-out portion 10a, and each is provided with an inset movable rudder portion 13a hinged thereto and controllable in the usual manner. The horizontal stabilizer 12 has a cut-out portion 12a into which is inserted an elevator 14 that is hinged to the horizontal stabilizer. The elevator 14 may also include therein a trim tab 15 hinged thereto and movable to adjust the trim of the aircraft to suit particular load conditions. It is important to note that the cut-out segmental portion 10a provides the main airfoil 10 with a linear trailing edge and that the pair of vertical stabilizers 13 overlap this trailing edge in spaced apart relation to form a channel for preventing sidewise spillage of the airflow over this trailing edge adjacent the ends of the cut-out portion. Thus when in accordance with the principles of the persent invention the segmental shaped horizontal stabilizer 12 is mounted between the pair of spaced apart vertical stabilizers 13 with the linear leading edge thereof in elevater offset alignment with the linear trailing edge of the main airfoil 10 as shown in Fig. 1 this stabilizer 12 will operate in the relatively undisturbed air stream flowing through the channel between the vertical stabilizers 13. Such elevated mounting of the horizontal stabilizer 12 constitutes a rugged structure that frees this control element from the turbulence normally produced at the linear trailing edge of the mail airfoil 10 and also enables the mail airfoil 10 to have the greatest and most advantageous angle of attack during the landing and takeoff of the aircraft without interference with the ground.

A suitable canopy that may be made of a transparent molded plastic is provided on the forward portion of the main airfoil 10, and cooperates with a footwell 17 to provide a housing for passengers that is partially enclosed within the main airfoil. Of course, the controls for the elevators, rudders, ailerons and trim tab are located therein.

A conventional two-wheel landing gear 18 may be mounted on the under side of the footwell 17, and a pivotable tail wheel 20 may be mounted under each of the vertical stabilizers 13. Thus, the aircraft is provided with a four-point landing gear comprising two widely spaced tail wheels and two more closely spaced nose wheels. The tail wheels 20 and the main landing gear 18 are so mounted relative to each other that, when the aircraft is resting on the ground, the main airfoil 10 assumes a definite positive angle of attack. Therefore, the aircraft may be in its most advantageous position when taking off and landing.

Although the improved aircraft is illustrated with the canopy 16 and the footwell extending above and below the main airfoil, respectively, it is apparent that in a large aircraft such as a transport the main airfoil may be of sufficient thickness in itself to provide the housing for passengers. In this case, visibility may be provided through transparent portions of the leading edge of the main airfoil. Thus, the aircraft may appear even more like a flying wing than the small aircraft, and the landing gear may be retractable into the underside of the main airfoil. In the form of the invention illustrated, which is a small craft of the sport variety, the landing gear is not retractable.

Motive power for the aircraft may be provided by a propeller 21 driven by a conventional reciprocated air cooled engine included within the leading edge of the main airfoil 10. Air intakes 22 and outlets (not shown) may be provided in the leading edge and the underside, respectively, of the main airfoil. Alternatively, the aircraft may be propelled by a jet engine, which may be enclosed within the main airfoil in the same manner as a reciprocating engine. However, in this case, the internal construction may be altered so that the propelling jet may be exhausted at the trailing edge of the main airfoil 10 between the vertical stabilizers 13 in substantial alignment with the flight axis of the aircraft. Combustion air may be supplied to the engine through the air intakes 22.

The improved aircraft of the invention may be constructed in accordance with conventional practices, and may comprise main ribs of light aluminum tubing reinforced in the usual manner with cross braces. The various elements of the aircraft may be covered with fabric or thin aluminum sheet. One of the features of the invention is that the outer edge of the aircraft may be formed of strong aluminum tube of substantially circular shape, broken only at the trailing edge and to provide dihedral. Thus, the main airfoil has maximum strength and ability to resist deformation, and yet the aircraft may be light in weight.

The improved aircraft illustrated and described herein, when built with an approximately 18 foot diameter, is comparable to the light personal aircraft known today, and may be powered with a standard 65–85 horsepower engine. However, a conventional aircraft of this type requires a wingspan of approximately 36 feet, while the aircraft of the invention requires a wingspan of only approximately 18 feet, and, in addition, provides substantially more effective wing area. Thus, the improved aircraft is capable of landing at a slower speed than conventional aircraft, and may land in areas that are inaccessible to conventional craft. In addition, the increased effective wing area of the improved aircraft gives the craft much greater stability in flight, and makes it much less susceptible to the sudden rises and falls to which conventional aircraft are subject due to air pockets, sudden draughts, and the like. The light weight of the craft, combined with its large effective wing area, permits very economical operation.

It is now apparent that I have provided a greatly improved aircraft, and one that attains the objectives set forth above. It is also apparent that many changes and modifications may be made by one skilled in the art, and, therefore, the invention is intended to be limited only by the scope of the appended claims.

What I claim as new and desire to secure by Letters Patent of the United States is:

1. In an aircraft, the combination of a main airfoil of substantially discoid shape to provide a circular leading edge and having a cut-out segmental portion to provide a linear trailing edge, a trailing horizontal stabilizer of substantially complementary segmental shape mounted with the linear leading edge thereof in elevated offset alignment with the linear trailing edge of said main airfoil to operate in the relatively undisturbed air stream above said main airfoil, and a pair of ailerons, each located at an opposite end of said cut-out segmental portion and hinged to said main airfoil, said ailerons and said horizontal stabilizer lying behind the trailing edge of said main airfoil.

2. In an aircraft, the combination of a main airfoil of substantially discoid shape to provide a circular leading edge and having a cut-out segmental portion to provide a linear trailing edge, a pair of vertical stabilizers mounted to overlap the trailing edge of the main airfoil in spaced apart relation and form a channel for preventing sidewise spillage of the airflow over said trailing edge adjacent the ends of said cut-out segmental portion, a trailing horizontal stabilizer of substantially complementary segmental shape mounted between said vertical stabilizers with the linear leading edge thereof in elevated offset alignment with the linear trailing edge of the main airfoil to operate in the airflow through said channel above said main airfoil, and a pair of ailerons, each located at an opposite end of said cut-out segmental portion and hinged to said main airfoil, said ailerons and said horizontal stabilizer lying behind the trailing edge of said main airfoil.

3. In an aircraft, the combination of a main airfoil of substantially discoid shape to provide a circular leading edge and having a cut-out segmental portion to provide a linear trailing edge, a pair of vertical stabilizers mounted to overlap the trailing edge of the main airfoil in spaced apart relation and form a channel for preventing sidewise spillage of the airflow over said trailing edge adjacent the ends of said cut-out segmental portion, a trailing horizontal stabilizer of substantially complementary segmental shape mounted between said vertical stabilizers with the linear leading edge thereof in elevated offset alignment with the linear trailing edge of the main airfoil to operate in the airflow through said channel above said main airfoil with a negative angle of attack of approximately 5° relative to said main airfoil, and a pair of ailerons, each located at an opposite end of said cut-out segmental portion and hinged to said main airfoil, said ailerons and said horizontal stabilizer lying behind the trailing edge of said main airfoil.

References Cited in the file of this patent

UNITED STATES PATENTS

| | | |
|---|---|---|
| D. 150,926 | Burnelli | Sept. 14, 1948 |
| 1,735,308 | Worrell | Nov. 12, 1929 |
| 2,431,293 | Zimmerman | Nov. 18, 1947 |
| 2,619,302 | Loedding | Nov. 25, 1952 |
| 2,681,773 | Rethorst | June 22, 1954 |
| 2,730,312 | Crookes | Jan. 10, 1956 |